United States Patent
Gassmann

[11] Patent Number: 5,653,639
[45] Date of Patent: Aug. 5, 1997

[54] VIBRATION DAMPENING TORQUE TRANSMITTING COUPLING DISC WHICH ENABLES VARYING OF THE DAMPING CROSS SECTION OF THE CIRCUMFERENTIAL GAPS AS A FUNCTION OF THE ANGLE OF ROTATION

[75] Inventor: Theodor Gassmann, Siegburg, Germany

[73] Assignee: GKN Automotive AG, Lohmar, Germany

[21] Appl. No.: 246,347

[22] Filed: May 19, 1994

[30] Foreign Application Priority Data

May 21, 1993 [DE] Germany ............... 43 17 024.2

[51] Int. Cl.⁶ .................................................. F16D 3/80
[52] U.S. Cl. .................................................. 464/24; 464/68
[58] Field of Search ............................... 464/24, 27, 68

[56] References Cited

U.S. PATENT DOCUMENTS

| 2,513,379 | 7/1950 | Thelander | 464/27 X |
|---|---|---|---|
| 4,601,676 | 7/1986 | Tojima et al. | 464/24 |
| 4,674,991 | 6/1987 | Tojima et al. | |
| 4,906,220 | 3/1990 | Wörner et al. | 464/24 X |
| 5,180,044 | 1/1993 | Fukushima et al. | |

FOREIGN PATENT DOCUMENTS

| 451555 | 4/1913 | France. | |
|---|---|---|---|
| 2624236 | 12/1987 | France. | |
| 1240341 | 10/1963 | Germany. | |
| 2362128A1 | 6/1975 | Germany. | |
| 2848748 | 8/1980 | Germany. | |
| 3528175 | 2/1987 | Germany. | |
| 3545745A1 | 6/1987 | Germany. | |
| 3621997 | 1/1988 | Germany. | |
| 3820998 | 8/1989 | Germany. | |
| 61-51686 | 11/1986 | Japan. | |
| 143172 | 9/1989 | Japan. | |
| 235233 | 2/1990 | Japan. | |
| 2197050 | 5/1988 | United Kingdom | 464/24 |
| 2221013 | 1/1990 | United Kingdom. | |
| 2235963 | 3/1991 | United Kingdom. | |
| 2245337 | 1/1992 | United Kingdom. | |

*Primary Examiner*—Daniel P. Stodola
*Assistant Examiner*—Emmanuel M. Marcelo
*Attorney, Agent, or Firm*—Harness, Dickey & Pierce, P.L.C.

[57] ABSTRACT

A coupling disk has a varying damping cross section of the circumferential gaps as a function of the angle of rotation of the first annular part relative to the second annular part. Thus, in the circumferential gaps, as a result of the shearing effect of the damping fluid, variable damping occurs as a function of the quasi-static angle of rotation due to torque and as a function of the periodic angle of oscillation due to rotational oscillations between the first annular part and the second annular part.

14 Claims, 6 Drawing Sheets

VIBRATION DAMPENING TORQUE TRANSMITTING COUPLING DISC WHICH ENABLES VARYING OF THE DAMPING CROSS SECTION OF THE CIRCUMFERENTIAL GAPS AS A FUNCTION OF THE ANGLE OF ROTATION

BACKGROUND OF THE INVENTION

The present invention relates to a device for transmitting forces in a vibration damping way, more specifically, to a coupling disc incorporated into a driveline of a motor vehicle.

As an interface system between the engine and gearbox, the coupling disc in the driveline of a motor vehicle has a major influence on the vibration behavior and thus on the acoustic behavior of the driveline of the motor vehicle. The usable speed range of an internal combustion engine contains a large number of different types of natural driveline vibrations which may be excited when the band of rotational non-uniformity of the combustion engine is passed through, thereby leading to resonances and thus noise. The tendency to use lighter and lighter engines with higher performance densities and thus with a high degree of rotational non-uniformity and lighter drivelines featuring low losses and thus fewer damping means but a higher degree of sensitivity, pushes vibration and acoustic problems more and more into the foreground and leads to more stringent requirements in respect of the interface system of the coupling disc in the driveline of the motor vehicle.

The most important tasks of the coupling disc damper are: 1) displacing the natural frequencies outside the usable speed band; 2) isolating the driveline from any excitation by the internal combustion engine; and 3) damping resonance frequencies. In principle, the coupling disc damper acts as a low pass filter.

Such a system would exhibit an ideal transmission behavior if damping were infinite in the resonance range ($\omega \leq \sqrt{2}\, \omega_o$) and zero in the isolation range ($\omega > \sqrt{2}\, \omega_o$). The objective of all these measures is for the coupling disc to come closer to such an ideal.

The optimization of a friction disc damper is complicated by the fact that different load and operating conditions of the internal combustion engine, acceleration under full load; idling; load changes, require completely different stiffness and damping characteristics. Attempts have been made to optimize the damping behavior by using multi-step friction dampers and additional friction steps with play. Such measures complicate the systems, may lead to internal vibration and noise problems hitting the various steps and always represent a more or less unsatisfactory compromise. It becomes more and more difficult to meet the more demanding requirements by means of the conventional, friction-damped, multi-step coupling disc.

DE-AS 28 48 748 discloses a resilient coupling. The coupling has a first annular part and a second annular part. Complementary inwardly pointing surfaces at one annular part and outwardly pointing surfaces at the outer annular part form chambers and throttling channels connecting same. When one annular part rotates relative to the other annular part, the sizes of adjoining chambers change in opposite directions so that damping fluid is pressed through the channels while generating a throttling effect. On their sides, the chambers are delimited by planar radial walls.

DE 35 28 175 A1 discloses a viscous damping means on a two-part flywheel. The damping means only becomes effective after a certain freewheeling action, for example after a non-damping relative rotation of the two parts of the flywheel of ±10°. This is ensured by uniformly circumferentially distributed damping faces on the two flywheel parts which are resiliently connected to one another, which do not overlap in an unrotated position and which, after having rotated relative to one another, form a damping gap for shearing the fluid.

DE 36 21 997 A1 discloses a two-part flywheel of the above-mentioned type where differently shaped friction linings are additionally provided across the circumference. The linings contact one another and are alternately connected to the one and the other of the flywheel parts. Initially, the damping effect is high, both in the region of the friction linings and in the region of the damping gaps, and after the two flywheel parts have rotated relative to one another, by an angle of rotation of ±10° for example, the damping effect is clearly reduced.

A coupling disc of the species as proposed by the present invention is disclosed in U.S. Pat. No. 4,674,991 where circumferential gaps between the first annular part and the second annular part are formed by annular projections engaging one another in cross-section. The surfaces forming the circumferential gaps are provided directly at the first annular part and at the second annular part, so that the shear rate of the viscous fluid is constant as a function of the angle of rotation. The possibilities of influencing the damping characteristics are thus extremely limited.

SUMMARY OF THE INVENTION

It is an object of the invention to provide a coupling disc with improved damping characteristics. The objective is achieved by varying the damping cross-sections of the circumferential gaps as a function of the angle of rotation of the first annular part relative to the second annular part. Thus, in the circumferential gaps, as a result of a shear effect in the damping fluid, variable damping occurs as a function of the quasi-static angle of rotation due to torque and as a function of the periodic angle of oscillation due to rotational oscillations between the first annular part and the second annular part.

In preferred embodiments, the damping circumferential length of the circumferential gaps is variable as a function of the angle of rotation of the first annular part relative to the second annular part. Also, the damping relative movement of the surfaces forming the circumferential gaps is not proportional to the change in the angle of oscillation of the first annular part relative to the second annular part. The quasi-static angle of rotation refers to the basic condition of the coupling disc which depends on the torque introduced and the periodic angle of oscillation refers to the oscillatory condition superimposed by the rotational non-uniformity of the internal combustion engine.

According to the first equation, the circumferential gaps with the damping effect may be changed such that, with an increasing angle of rotation, they become narrower or wider and/or that their surface with the damping effect increases or decreases in size as a function of the angle or rotation. For example, it is possible to change the contour of the first annular part forming the housing, with the respective counter face of a plate connected to the hub forming a narrow circumferential gap therewith only after a predetermined angle of rotation has been reached and/or with the surface of the plate positioned between operative circumferential gaps which is changed together with the angle of rotation.

According to one embodiment, at least one radial plate, which forms at least two radial circumferential gaps with the first annular part, is non-rotatably connected to the hub. The at least one plate includes apertures which, in a neutral position, are associated with drawn-in portions of the first annular part. Upon rotation of the first annular part relative to the second annular part, the plate parts enter the narrower regions of the circumferential gaps between the drawn-in portions.

According to a further embodiment, at least one radial plate is non-rotatably connected to the hub. The at least one radial plate engages the first annular part in the direction of rotation, thus, together, forming at least one circumferential gap. The plates include circumferentially offset apertures whose degree of overlapping changes when the first annular part rotates relative to the second annular part.

According to the second equation, it is possible, at the start of the oscillation amplitude between the first annular part and the second annular part, to enable any plates connected to the first annular part to rotate freely relative to the first annular part by enabling freewheeling or providing a circumferential play. Only after a certain amount of angular deflection, the respective plate is non-rotatably connected to the first annular part by rotational stops. This measure results in an increase in the degree of viscous damping when exceeding an angle of oscillation, which is predetermined by the freewheeling movement.

According to a further embodiment, in order to achieve graduated damping characteristics as a function of the angle of oscillation, at least one of the plates associated with the first annular part may be rotatable by a limited angle of rotation relative to the first annular part. In order to achieve more refined graduation, such as multiple stages of damping characteristics as a function of the angle of oscillation, a plurality of plates connected to the first annular part in the rotational direction are rotatable by different angular deflection values relative to the first annular part.

In practice, plates with radially outer tooth projections engage tooth recesses of the first annular part, with predetermined amounts of circumferential play $S_1"$ or $S_2"$ provided as far as the rotational stop.

As is common practice and to achieve the neutral position, spring means are provided in the form of pressure springs. The pressure springs are positioned in protuberances in the first annular part. Each protuberance encloses a circular cylinder which extends tangentially relative to the rotational axis. In the associated recesses in the plates, with the pressure springs in their neutral positions, the springs are supported on the first annular part. When the first annular part is rotated relative to the second annular part, the springs are pressurized at one end by the latter.

In a preferred embodiment, the spring means are pressure springs which are positioned in protuberances in the housing and in associated recesses in the radial disc member and in the plates. Furthermore, pressure springs are provided of different axial lengths which become operational in accordance with graduated angles of rotation of the first annular part relative to the second annular part. In a preferred embodiment, the pressure springs are supported relative to the annular parts by discs inserted perpendicularly relative to the longitudinal axis of the helical pressure springs.

The discs are preferably positioned in the protuberances in the housing of the first annular part and have a sealing effect. Upon rotation of the first annular part relative to the second annular part, the discs cause a hydrostatic displacement in order to achieve an additional damping effect. If the protuberances are each provided with a diameter which is variable as a function of the length, especially graduated, these additional damping means, too, can be provided with damping characteristics which depend on the angle of rotation.

The preferred damping fluid for filling the coupling disc in accordance with the invention is silicone oil whose temperature and shear behavior and its visco-elastic properties, at a higher frequency the damping effect decreases, are superior to those of greases and oils. The coupling disc may either be filled completely or only partially if the purpose is to compensate for temperature-dependent changes in volume.

According to a further embodiment, at least one plate connected to the second annular part as well as the housing of the first annular part enclosing the plate are provided with radially extending formations which alternate in opposite axial directions. Furthermore, in their axial extension, the formations of the housing are shaped such that by cooperating with correspondingly extending formations of the disc they limit the angle of rotation.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments will be described below with reference to the drawings wherein.

DETAILED DESCRIPTION OF THE PREFERRED EMBODIMENTS

Figure 1:
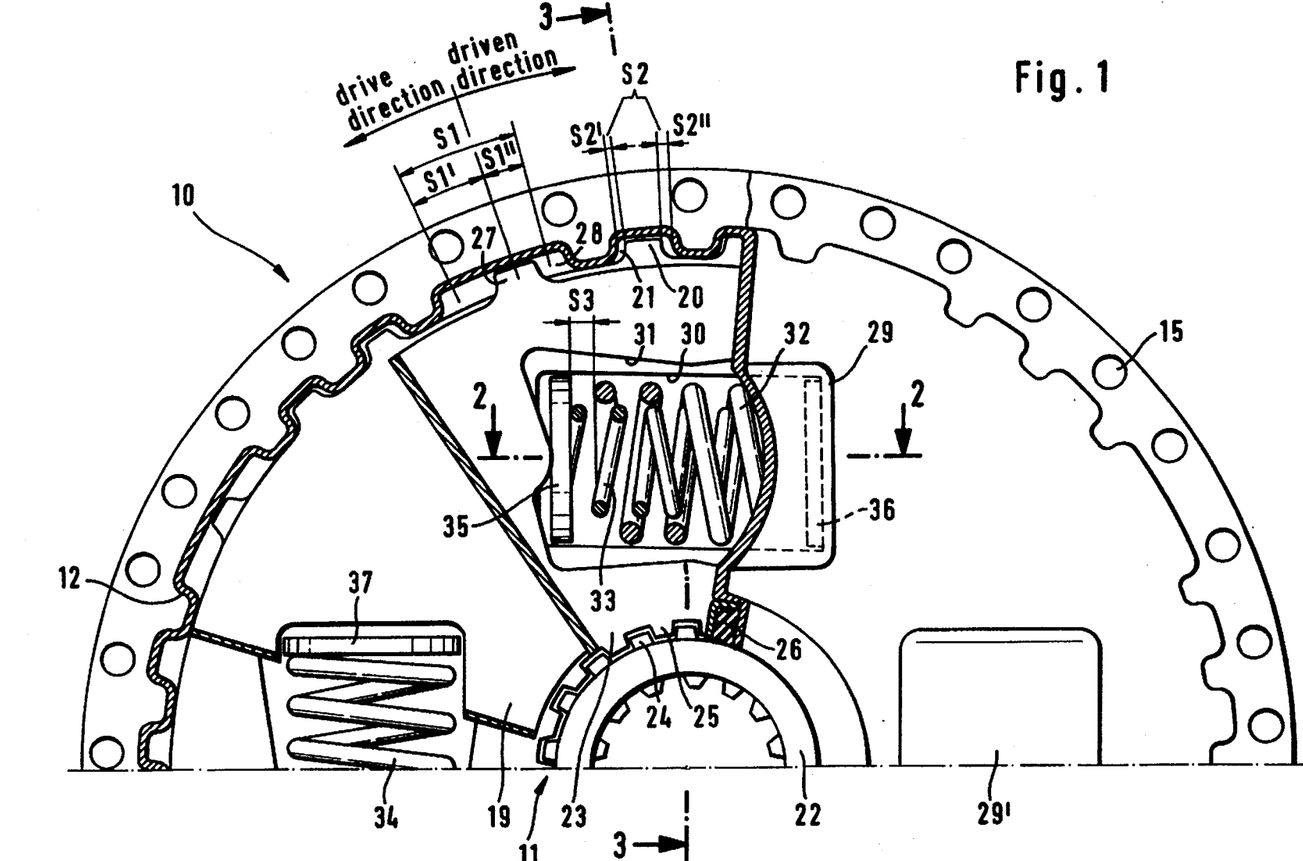
FIG. 1 is a radial sectional view through a first embodiment of a coupling disc in accordance with the invention.
Figure 2:
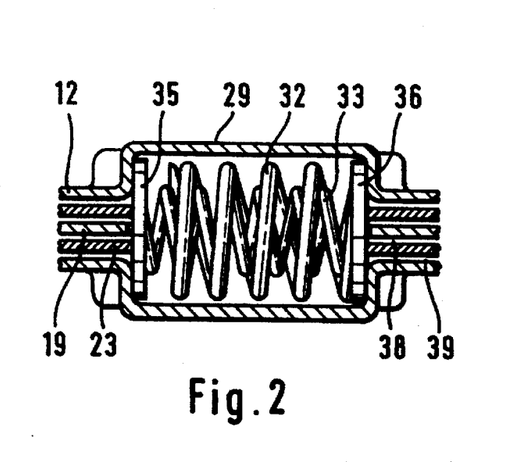
FIG. 2 is a tangential sectional view along line 2—2 according to FIG. 1.
Figure 3:
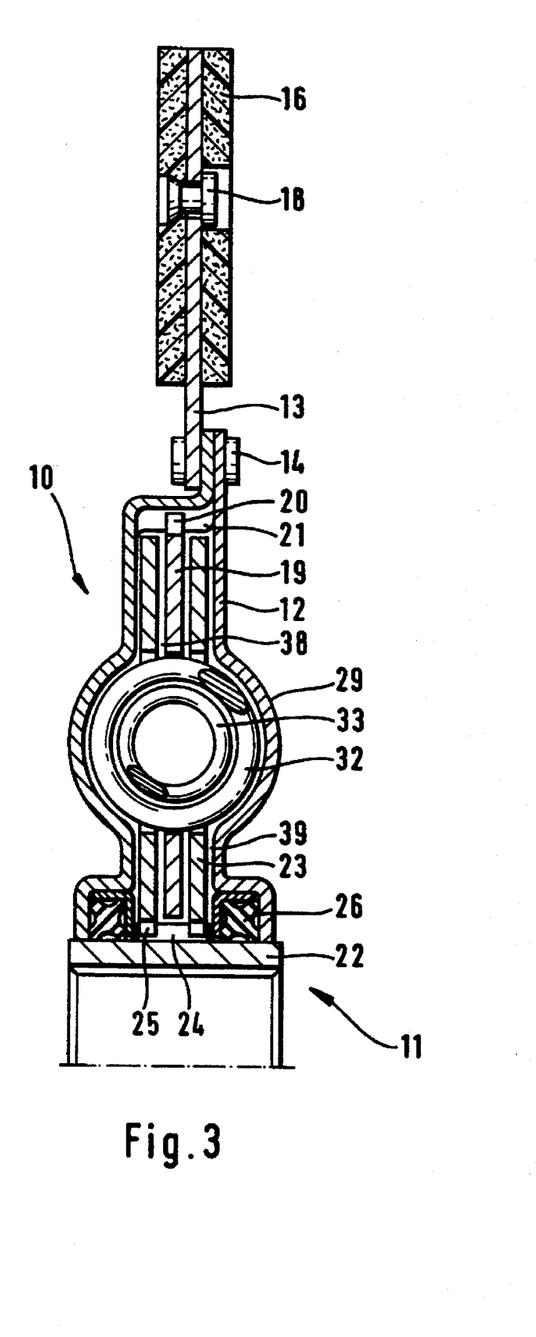
FIG. 3 is half an axial sectional view along line 3—3 according to FIG. 1.

FIGS. 1 to 3 will be described jointly, and any details which correspond to one another will be given the same reference numbers. The coupling has an outer annular part 10 and an inner annular part 11 which are rotatable relative to one another by a limited angle of rotation. The outer annular part 10 includes a double-walled housing 12, with an annular disc 13 riveted to its outer rim by rivets 14. FIG. 1 only shows the respective fixing holes 15.

The annular disc 13 carries the coupling linings 16 which are also secured by rivets 18. A central plate 19 cooperates with the first annular part 12 in the direction of rotation. The plate 19, on its outer circumference, includes tooth projections 20 which, with a circumferential play $S_2=S_2'+S_2''$, engage the tooth recesses 21 in the housing 12.

The second annular part 11 includes a hub 22 with nonrotatably secured radial plates 23. For this purpose, the hub 22 includes outer teeth 24 which non-rotatably cooperate with inner teeth 25 of the plates 23. The housing 12 is sealed by seals 26 relative to the hub 22. The plates 23 include outer tooth projections 27 which engage tooth recesses 28 in the housing 12. A circumferential play $S_1=S_1'+S_1''$ exists, which provides a stop to limit the angle of rotation of the first annular part relative to the second annular part. As indicated by the terms "drive direction" and "driven direction" and by arrows, the circumferential play differs as a function of the drive direction.

The housing 12 is provided with tangentially extending, straight-lined protuberances 29, 29' of a limited axial length which, in a first approximation, enclose a cylinder. Pairs of protuberances 29, 29' oppose one another around the disc. Apertures 30, 31 in the plates 19, 23 match the recesses. Pressure springs 32, 33, 34 supported at one end on discs 35, 36, 37 are inserted into the protuberances 29, 29' and into the apertures 30, 31. The protuberances 29 (only one is shown) house springs 32, 33 while the protuberances 29' house springs 34. The recesses 31 are slightly larger than the recesses 30 holding the pressure springs in order to allow a rotational movement of the annular parts relative to one another. First circumferential gaps 38 are formed between the plates 19 and the plates 23 and second circumferential gaps 39 are formed between the plates 23 and the housing 12. When rotating the outer annular part 10 relative to the inner annular part 11, viscous damping occurs in the annular gaps 39 between the plates 23 and the housing 12. As a function of the magnitude of the angular deflection, the plate 19, by means of viscous friction, is initially able to rotate with the plates 23 in a substantially undelayed way until the tooth projections 20, after having overcome the circumferential play $S_2'$ or $S_2''$ respectively, come to rest against the tooth recess 21 of the housing 12 of the outer annular part 10. From that point onwards, the plate 19 is firmly connected to the housing 10 and, as a function of oscillation, viscous damping occurs even in the circumferential gaps 38.

When rotating the annular parts 10 and 11 relative to one another, initially the pressure springs 33 are shortened at the same time, and after a tangential distance $S_3$ has been covered, the pressure springs 32 are also shortened. In the process, parts of the plates 23 act on one of the discs 35, 36 whereas the other disc is supported on the end of the protuberances 29 in the housing 12. The disc cooperating with the plates 23 is axially displaced in the cylindrical protuberance 29, which results in a hydrostatic displacement inside the protuberance which, in turn, increases the damping effect.

Figure 4:
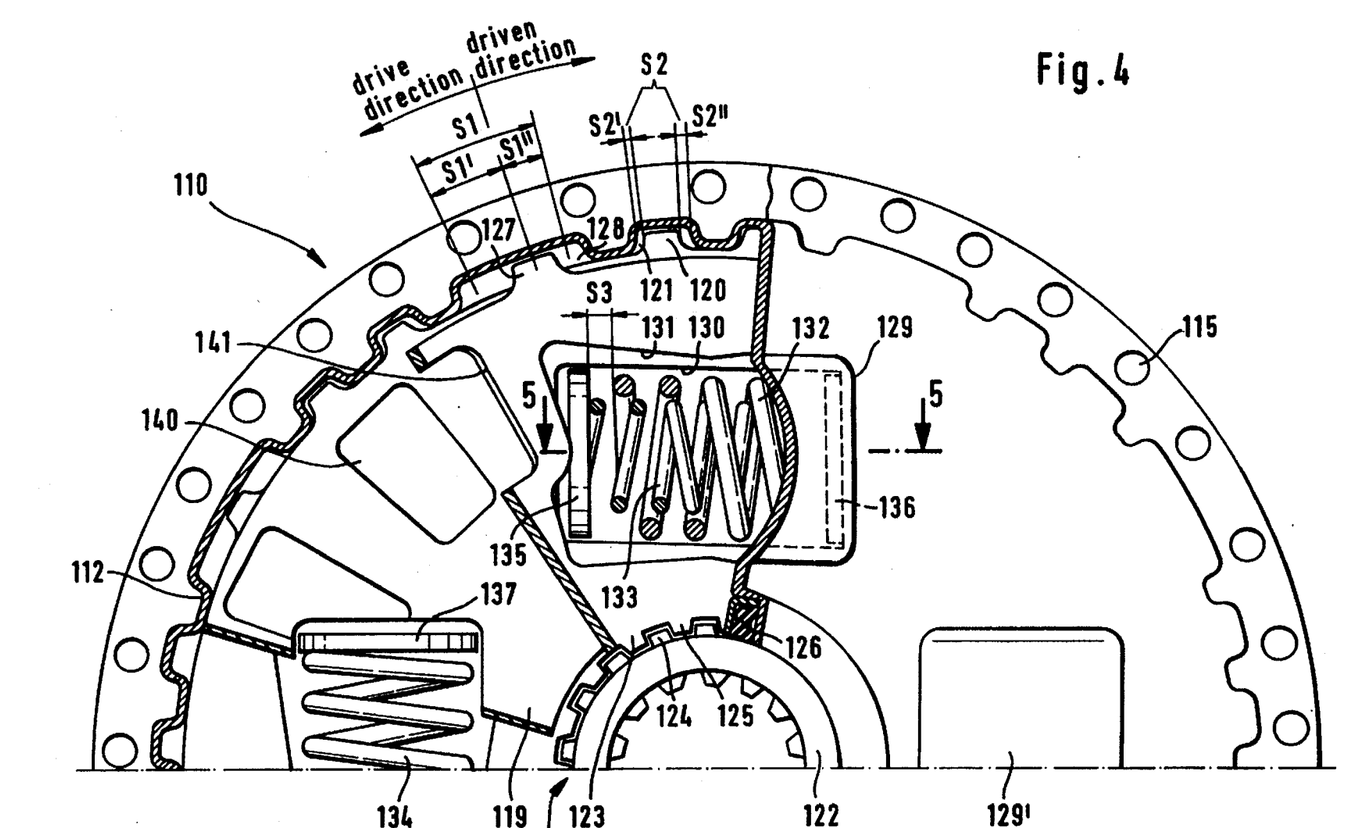
FIG. 4 is a radial sectional view through a second embodiment of a coupling disc in accordance with the invention.
Figure 5:
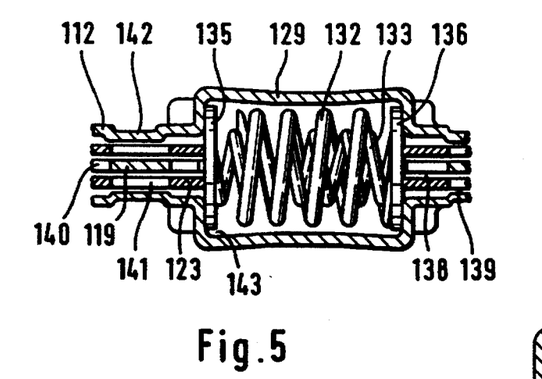
FIG. 5 is a tangential sectional view along line 5—5 according to FIG. 4.

In FIGS. 4 and 5, the reference numbers of any details corresponding to those given in FIGS. 1 and 2 have been increased by 100. Reference is made to the contents of the description to the extent that FIGS. 4 and 5 correspond to FIGS. 1 and 2.

FIGS. 4 and 5 deviate in that the plate 119 which is associated with the housing 112 and which, after overcoming the gap $S_2'+S_2''$, comes to rest thereagainst, is provided with first apertures 140. The plates 123 are provided with second apertures 141. In the neutral position, the apertures and recesses are offset relative to one another. In those cases where at least one of the apertures is provided in the surface of the plates, an effective circumferential gap does not occur. To the extent that, upon a relative rotation of the first annular part 110 relative to the second annular part 111, the apertures 140, 141, gradually move into an overlapping position and move out of the position where they overlap with the recesses, the ineffective surface area of the plates is reduced and the overall area of circumferential gaps increases, so that the viscous damping effect is increased.

The relation between an increase in the angle of rotation and an increase in damping can be freely determined by means of the apertures 141 and 140.

FIG. 5 shows that the protuberances 129 are not cylindrical but that their free cross-section decreases towards the center in a doubly conical way. In consequence, when the first annular part rotates relative to the second annular part, the annular gap 143 between the discs 135, 136 becomes increasingly narrower, so that hydrostatic damping steadily increases. The change in damping as a function of the angle of rotation may again be freely selected by giving the protuberances a suitable shape.

Figure 6:
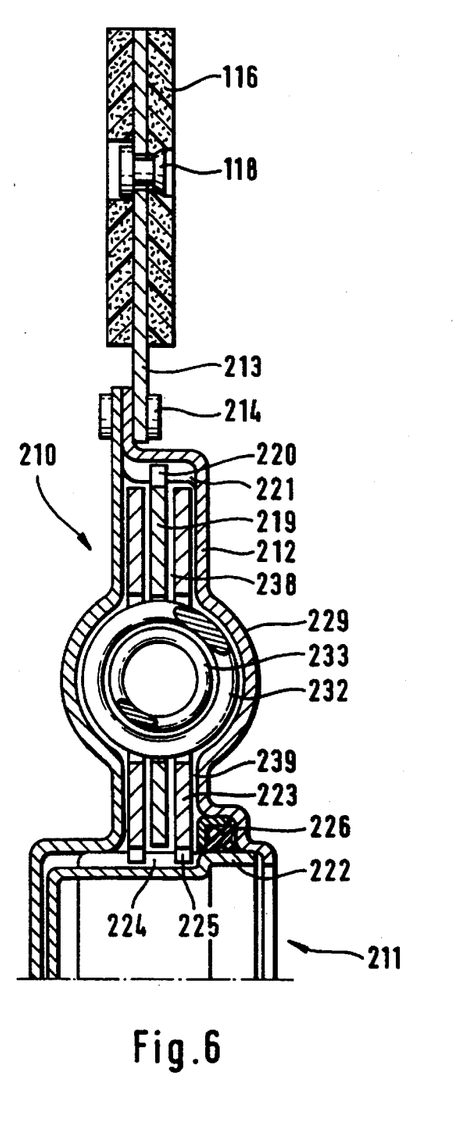
FIG. 6 is an axial sectional view of a third embodiment of a coupling disc in accordance with the invention.

In FIG. 6, the reference numbers of any details corresponding to those shown in FIG. 3 have been increased by 200. To the extent that the description of FIG. 6 corresponds to that of FIG. 3, reference is made to the description of the latter. Deviations occur with respect to the design of the hub 222 and the housing 212 which are each closed dish-like at one end, so that only one single annular seal 226 is required.

To simplify matters, the details in FIGS. 7 to 10 are given the same reference numbers as those in FIGS. 1 to 3, but they will be accompanied by indices to indicate the various modifications.

Figure 7:
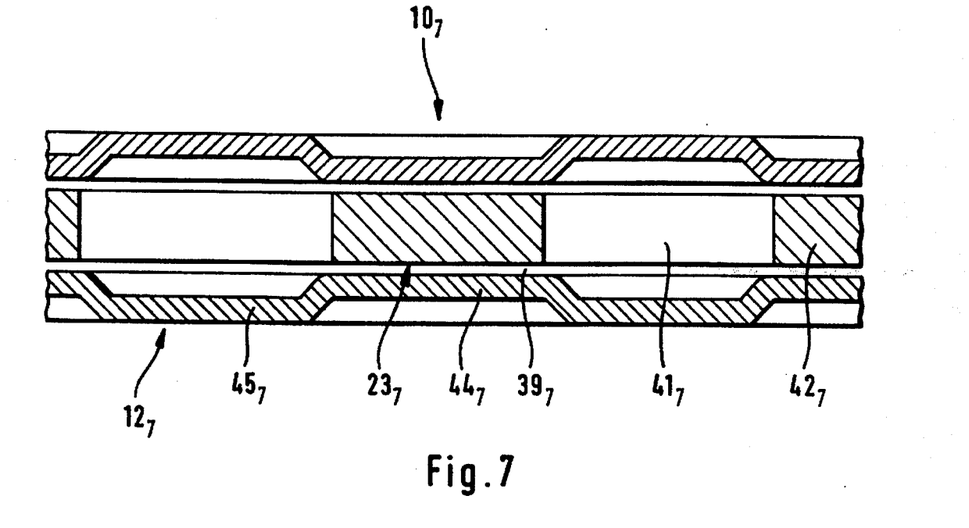
FIG. 7 is a cylindrical sectional view of a further embodiment through the annular parts of a coupling in accordance with the invention.

FIG. 7 shows the housing $12_7$ of the first annular part $10_7$ as well as one single plate $23_7$ non-rotatingly connected to the second annular part 11. The housing includes circumferentially distributed undeformed base portions $45_7$ and drawn-in portions $44_7$. The plate $23_7$ includes circumferentially alternating base portions $42_7$ and apertures $41_7$ associated with the base portions $45_7$ of the housing $12_7$. Gaps 38 are formed between the plate $23_7$ and the walls of the housing $12_7$. The illustrated positions of the disc-shaped parts relative to one another constitute the configuration as existing in the torque-free condition with unloaded pressure springs. It can be seen that a relative rotation will initially result in a high damping effect due to the shear effect of the damping fluid in the gaps $39_7$ with the shear effect continuously decreasing because the base portions $42_7$ of the plate $23_7$ enter the extended base portions $45_7$ of the housing $12_7$, as a result of which effective shearing is eliminated, while at the same time the apertures $41_7$ of the plate $23_7$ enter the regions of the drawn-in portions $44_7$ of the housing $12_7$' thereby shortening the effective gap $39_7$.

Figure 8:
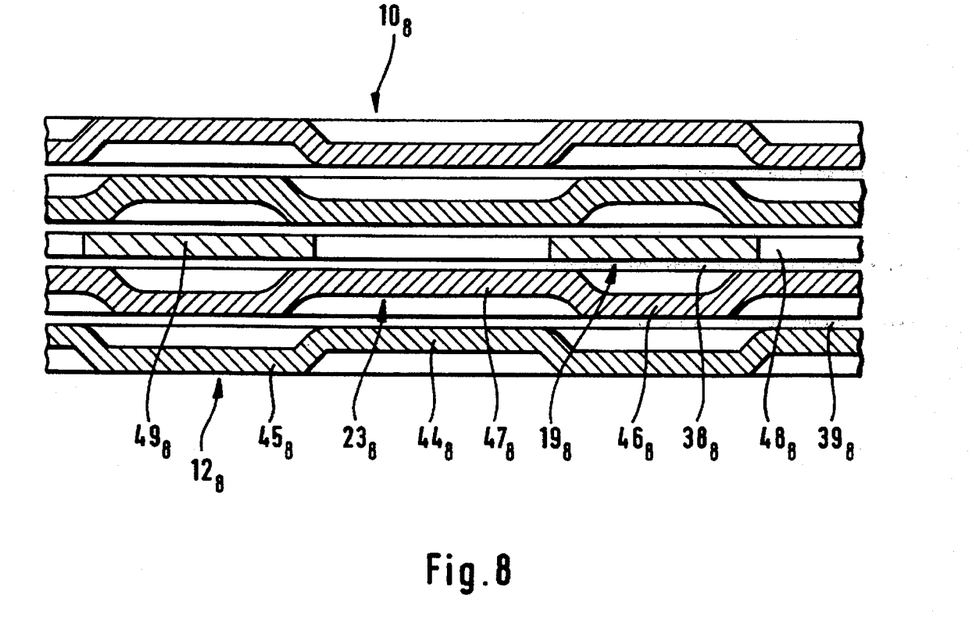
FIG. 8 is a cylindrical sectional view of a further embodiment through the annular parts of a coupling in accordance with the invention.

FIG. 8 shows the double-wall housing $12_8$ of a first annular part $10_8$, which in principle has the same shape as that shown in FIG. 7, and it includes undeformed base portions $45_8$ and lateral drawn-in portions $44_8$. The symmetric plates $23_8$ have the same shape as the housing walls and are non-rotatably connected to a second housing part. A plate $19_8$ is arranged between the two plates $23_8$, which is non-rotatably connected to the housing $12_8$. The latter plate $19_8$ includes circumferentially distributed base portions $49_8$ and apertures $48_8$ which, however, are associated with the drawn-in portions $44_8$ of the plates $23_8$. This position constitutes the configuration of the parts in the torque-free condition with the pressure springs unloaded. Therefore, upon commencement of a relative rotation which has to be regarded as a relative movement of the plates $23_8$, relative to the plates $19_8$, which are fixed relative to one another, and to the housing parts $12_8$, there are no effective gaps for shearing the damping fluid contained in the housing. Such effective gaps are formed in the region given the reference number $39_8$ only when the undeformed base portions $46_8$ of the plates $23_8$ enter the regions of the drawn-in portions $44_8$ of the housing $12_8'$ and in the gap $38_8$ when the drawn-in portions $47_8$ of the plates $23_8$ enter the base portions $49_8$ of the central plate $19_8$. In consequence, the damping behavior is reciprocal to that of the embodiment shown in FIG. 7.

Figure 9:
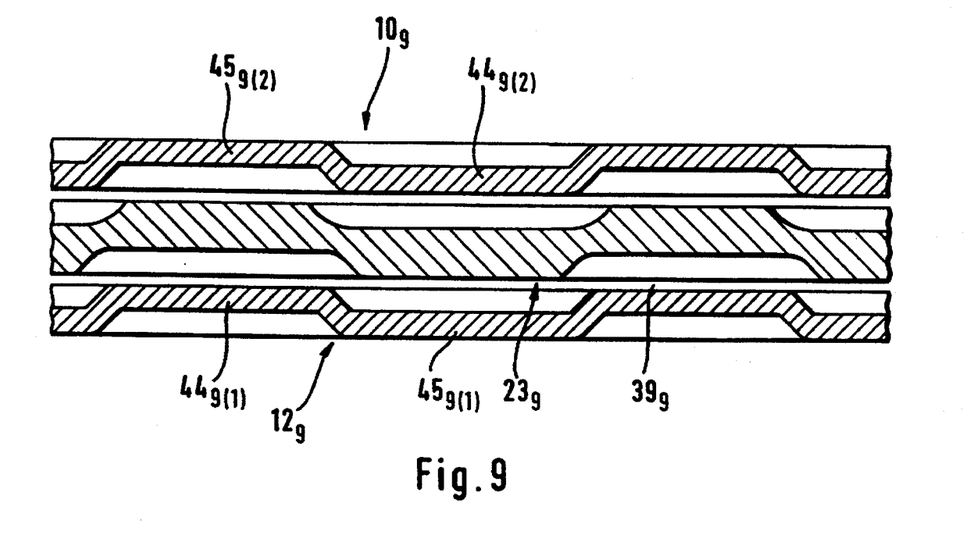
FIG. 9 is a cylindrical sectional view of a further embodiment through the annular parts of a coupling in accordance with the invention.

FIG. 9 shows the housing $12_9$ of a first annular part $10_9$ and a plate $23_9$ connected to a second annular member (not illustrated). In this case, the walls of the housing $12_9$ are not deformed symmetrically relative to the central plane. On the contrary, drawn-in portions $44_{9(1)}$ are arranged opposite base portions $45_{9(2)}$ on the other housing wall and drawn-in portions $44_{9(1)}$ are arranged opposite base portions $45_{9(1)}$ in the latter housing wall. The plates $23_9$ are alternately deformed in the same sense so that the assembly may be regarded as a stack of similar plates. In the starting position as illustrated which occurs when the coupling disc is in a torque-free condition, and when the pressure springs are unloaded, there are no effective narrow shear gaps, which is also the case with the embodiment according to FIG. 8. Shear gaps only occur in the regions given the reference number $39_9$ after a relative rotation of the parts relative to one another, so that an increasing damping effect is obtained.

Figure 10:
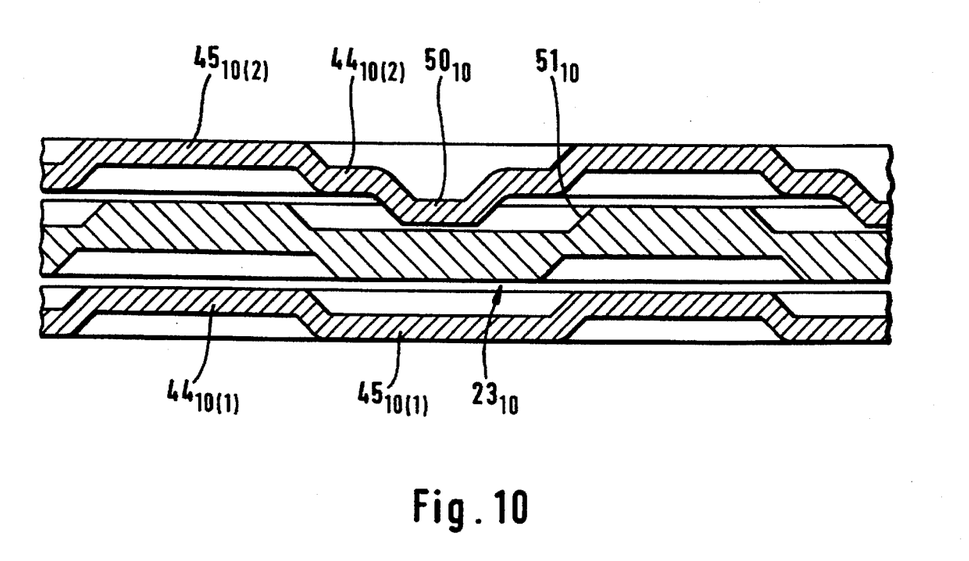
FIG. 10 is a cylindrical sectional view of a further embodiment through the annular parts of a coupling in accordance with the invention.

The assembly shown in FIG. 10 largely corresponds to that illustrated in FIG. 9 and reference is therefore made to the description thereof. The drawn-in portions $44_{10(2)}$ of the one housing wall deviate from FIG. 9 in that they include further deeper indentations $50_{10}$ which cooperate with steps $51_{10}$ at the plate $23_{10}$ in the sense of acting as a rotation preventing stop.

While the above detailed description describes the preferred embodiment of the present invention, the invention is susceptible to modification, variation, and alteration without deviating from the scope and fair meaning of the subjoined claims.

I claim:

1. A coupling device for transmitting torque in a vibration damping way, incorporated into the driveline of a motor vehicle, comprising:

a first annular part whose outer circumference includes means for introducing a torque;

a second annular part having a hub for receiving a torque therefrom;

said first annular part including a double-wall housing, said housing forming a chamber which is sealed relative to said second annular part adjacent the hub;

said second annular part including at least one radial disc member, said first and second annular parts being rotatable relative to one another by a limited angle of rotation and in circumferential relation supporting one another by spring means, the chamber being filled with a damping fluid and surfaces of the first annular part and of the second annular part in the chamber facing each other at an axial distance forming circumferentially extending circumferential gaps having an axial gap width where viscous damping by the damping fluid takes place in the circumferential gaps, as a result of a shear effect in the damping fluid when the two annnlar parts move rotationally relative to one another;

the circumferential gaps define damping first gap portions of smaller gap width and second gap portions of greater gap width, the ratio of said first and second portions being variable as a function of the angle of rotation of the first annular part relative to the second annular part so that variable damping occurs first as a function of a rotational displacement about a quasi-stationary angle between the first annular part and the second annular part due to torque transmitted through the coupling and secondly as a function of a rotational oscillation about a periodic angle due to driveline vibrations between the first annular part and the second annular part.

2. The device according to claim 1, wherein the relative movement of the surfaces forming the circumferential gaps being effective for damping is non-proportional to the change in the angle of oscillation of the first annular part relative to the second annular part.

3. The device according to claim 1, wherein at least one radial plate forming at least two radial circumferential gaps with the first annular part is non-rotatably connected to the hub, said first annular part including drawn-in portions, said at least one plate includes apertures which, in a neutral circumferential position, are in coverage with said drawn-in portions of the first annular part, and upon rotation of the first annular part relative to the second annular part, closed material plate parts enter regions of the circumferential gaps between the drawn-in portions which are narrower than the rest of the circumferential gaps, so that by relative movement of said surfaces of the first annular part and the second annular part, the circumferential lenqth of the circumferential gaps being effective for damping is variable as a function of the angle of rotation of the first annular part relative to the second annular part.

4. The device according to claim 1, wherein at least one first radial plate is non-rotatably connected to the hub, and at least one second radial plate engages the first annular part in the direction of rotation, said at least one first radial plate and said at least one second radial plate together, forming at least one circumferential gap, and said plates include circumferentially offset apertures whose degree of overlapping changes when the first annular part rotates relative to the second annular part, so that by relative movement of said surfaces of the first annular part and the second annular part, the circumferential length of the circumferential gaps being effective for damping is variable as a function of the angle of rotation of the first annular part relative to the second annular part.

5. The device according to claim 1, wherein the plates include radially outer tooth projections engaging tooth recesses of the first annular part and that predetermined amounts of circumferential play are provided from a neutral position to displaced positions of operational engagement in order to achieve damping characteristics as a function of the angle of oscillation, at least one plate associated with the first annular part is rotatable by a limited angle of rotation relative to the first annular part.

6. The device according to claim 1, wherein the plates include radially outer tooth projections engaging tooth recesses of the first annular part and that predetermined amounts of circumferential play are provided from a neutral position to displaced positions of operational engagement in order to achieve multiple stages of damping characteristics as a function of the angle of oscillation, a plurality of plates associated with the first annular part are rotatable by different angles of rotation relative to the first annular part.

7. A device according to claim 1, wherein said spring means are provided in the form of pressure springs which are positioned in protuberances in the housing and in associated recesses in the radial disc member and in the plates.

8. The device according to claim 7, wherein the pressure springs are supported relative to the annular parts by means of discs inserted perpendicularly relative to the longitudinal axis of the helical pressure springs.

9. The device according to claim 8, wherein the discs in the protuberances in the housing are positioned to have a sealing effect and that, upon rotation of the first annular part relative to the second annular part as a result of hydraulic displacement of the damping fluid, the discs generate an additional damping effect.

10. The device according to claim 7, wherein said pressure springs are provided with different axial lengths which become operational in accordance with graduated angles of rotation of the first annular part relative to the second annular part.

11. The device according to claim 7, wherein in order to achieve variable damping characteristics as a function of the angle of rotation, the protuberances are provided with graduated diameters which are variable in the circumferential direction.

12. The device according to claim 1, wherein in order to achieve damping characteristics as a function of the angle of rotation, a cross-sectional contour of the housing which damping effectively participates in forming the circumferential gaps, is variable in the circumferential direction.

13. The device according to claim 1, wherein the at least one plate connected to the second annular part as well as the housing of the first annular part enclosing the plate respectively are provided with formations which alternate in opposite axial directions and extend radially.

14. The device according to claim 13 wherein in axial extension the formations of the housing and the formations of the disc overlap such that by cooperating they limit the angle of relative rotation.

* * * * *